United States Patent [19]

Ziemek

[11] Patent Number: 5,072,870
[45] Date of Patent: Dec. 17, 1991

[54] METHOD AND APAPRATUS FOR FORMING METALLIC SHEATHS ABOUT OPTICAL CONDUCTOR ELEMENTS

[75] Inventor: Gerhard Ziemek, Langenhagen, Fed. Rep. of Germany

[73] Assignee: Kabelmetal Electro GmbH, Hanover, Fed. Rep. of Germany

[21] Appl. No.: 619,521

[22] Filed: Nov. 29, 1990

[30] Foreign Application Priority Data

Feb. 5, 1990 [DE] Fed. Rep. of Germany ....... 4003311

[51] Int. Cl.$^5$ .......................... B23K 9/00; B21D 39/04
[52] U.S. Cl. ...................................... 228/102; 29/447; 228/148; 228/17; 228/17.5; 228/9
[58] Field of Search ................... 228/102, 148, 103, 9, 228/15.1, 17, 17.5; 29/447, 828

[56] References Cited

U.S. PATENT DOCUMENTS

| | | | |
|---|---|---|---|
| 2,680,086 | 6/1954 | Hollingsworth et al. | 228/15.1 |
| 3,328,874 | 7/1987 | Davis et al. | 228/17 |
| 3,807,031 | 4/1974 | Jachimowicz et al. | 228/15.1 |
| 4,025,751 | 5/1977 | Wright | 29/447 |
| 4,246,687 | 1/1981 | Nolf | 29/447 |
| 4,379,009 | 4/1983 | Shibata et al. | 29/447 |
| 4,811,888 | 3/1989 | Ziemek et al. | 228/17.5 |
| 4,852,790 | 8/1989 | Karlinski | 228/148 |

FOREIGN PATENT DOCUMENTS

0152393 9/1982 Japan ................................. 228/102

*Primary Examiner*—Richard K. Seidel
*Assistant Examiner*—Jeffrey T. Knapp
*Attorney, Agent, or Firm*—James C. Langarathis

[57] ABSTRACT

There is disclosed a method and apparatus for forming a metallic sheath about a conductor element comprised of a plurality of optical fibers whose length within the sheath is uniformly greater than that of the encompassing sheath. Such forming is achieved by continuously drawing a metallic strip and a conductor element into a forming apparatus, while heating a portion of the metallic strip for temporarily lengthening it as it is being formed about the conductor element.

3 Claims, 1 Drawing Sheet

METHOD AND APAPRATUS FOR FORMING METALLIC SHEATHS ABOUT OPTICAL CONDUCTOR ELEMENTS

The invention relates to a method and apparatus for forming a metallic sheath about a conductor element comprised of a plurality of optical fibers and, more particularly, to such a method and apparatus that provide such a conductive element whose length is uniformly greater than the encompassing tubular sheath.

BACKGROUND OF THE INVENTION

It is priorly known to manufacture cable sheaths by the steps of continuously drawing a metal strip in a longitudinal direction through a plurality of forming rollers to form a hollow tubular sheath and then continuously welding the longitudinal abutting edges of the hollow tubular member. Further, it is known to form the metal strip around a cable core prior to the step of continuously welding the longitudinal abutting edges of the sheath. Additionally, it is known to include in such cable core a plurality of electrical and/or optical conductors.

Optical fibers priorly utilized in communication cables are notoriously known as being subject to mechanical damage as the result of tensional forces and small diameter bending. Consequently, numerous sheathing methods and apparatus have been priorly employed in an effort to protect the optical fibers from such forces and bending. One such method employed a corrugated metallic sheath formed about a conductor element comprised of a plurality of optical fibers. In such method, the conductor element was continuously drawn in a longitudinal direction at a speed greater than the speed at which a metallic strip was longitudinally drawn and formed about the conductor element. Another such method employed continuously drawing a metallic strip to which was bonded a conductor element comprised of a plurality of optical fibers. The metallic strip was formed into a tubular configuration about the conductor elements and a plurality of notches were formed in the circumferential direction, so that the sheath was shortened with respect to the encompassed conductor element.

Each of these known methods were expensive in execution, and the feature sought of having a conductor element length sufficiently greater than the length of the encompassing metallic sheath to avoid mechanical damage to the optical fibers, was not readily achieved. Such was the case especially with respect to the manufacture of optical conductor cables employed in submarine cables of extended lengths.

OBJECT OF THE INVENTION

An object of the invention is to provide a novel method and apparatus for forming a metallic sheath about a conductor element comprised of a plurality of optical fibers whose length within the sheath is uniformly greater than that of the sheath.

SUMMARY OF THE INVENTION

The object of the present invention is achieved by a method and apparatus for continuously drawing a metallic strip through a forming means; heating a portion of the continuously drawn, metallic strip as it enters the front end of the forming means for temporarily lengthening the metallic strip as it is being formed into a hollow tubular member; and continuously drawing the conductor element comprised of a plurality of optical fibers in a longitudinal direction into the front end of the forming means. Thereafter, the longitudinal edges of the tubular member formed about the conductor element are continuously welded. As a result of the aforesaid temporary lengthening of the metallic strip the absolute length of the conductor element is rendered greater than that of the encompassing, welded tubular member after cooling, thus providing a uniform excess length of the encompassed optical fibers for avoiding deleterious tensional forces.

The invention is based upon the following analysis:

The length of a conductor element comprised of a plurality of optical fibers encompassed by a welded, metallic sheath, may, at room temperature, be represented by $L_0$, both as to the conductor element and sheath.

If such sheath/element combination is elevated to a temperature $\Delta\theta$, then the length of the metallic sheath may be represented as follows:

$$L_{t1} = L_0 (1 + \alpha m \Delta\theta)$$

wherein:

$L_{t1}$ is the length of the metallic sheath at the elevated $\Delta\theta$ temperature;

$L_0$ is the length of the metallic sheath at room temperature; and $\alpha m$ is the linear coefficient of expansion of the metal of the metallic sheath.

Similarly, as to the conductor element of such heated sheath/element combination, its new length may be represented by:

$$L_{t2} = L_0 (1 + \alpha ge \Delta\theta),$$

wherein:

$L_{t2}$ is the length of the conductor element at the elevated $\Delta\theta$ temperature;

$L_0$ is the length of the conductor element at room temperature; and $\alpha ge$ is the linear coefficient of expansion of the conductor element (i.e., the optical fibers having plastic protective coatings thereon).

Since $\alpha ge$ for the materials of the coated optical fibers employed is very small for the temperature range of 0°–100° C., the expansion of the conductor element due to its being positioned within the heated metallic sheath is negligible.

From the aforesaid, it will be apparent that if the conductor element is introduced into a heated metallic sheath so as to have an equal length with the heated sheath, and the metallic sheath is then permitted to cool to room temperature and contract, the conductor element will have a length in excess of the length of the cooled metallic sheath by the factor of $(\alpha m - \alpha ge)\Delta\theta$. Since $\alpha m$ is a constant associated with the specific material of the metallic sheath, and $\alpha ge$ may be neglected, the excess length of the conductor element within the cooled metallic sheath may be precisely determined from the resultant of $\alpha m \Delta\theta$.

BRIEF DESCRIPTION OF THE DRAWINGS

A better understanding of the present invention as well as the objects and advantages thereof will become apparent upon consideration of the following detailed disclosure thereof, especially when taken with the accompanying drawing which is a diagrammatic representation of apparatus for manufacturing cable.

Referring to the drawing, a metallic strip 2 of, for example, steel or copper with a width of 25 mm. and a wall thickness of 0.9 mm. is drawn from a supply drum 1, passed through a degreasing bath 3 and into an input side of a trimming device 20 that trims the edges of the metallic strip 2 to assure a uniform width (for example, 21 mm.) and oxide free edges for subsequent longitudinal seam welding thereof.

Figure 1:
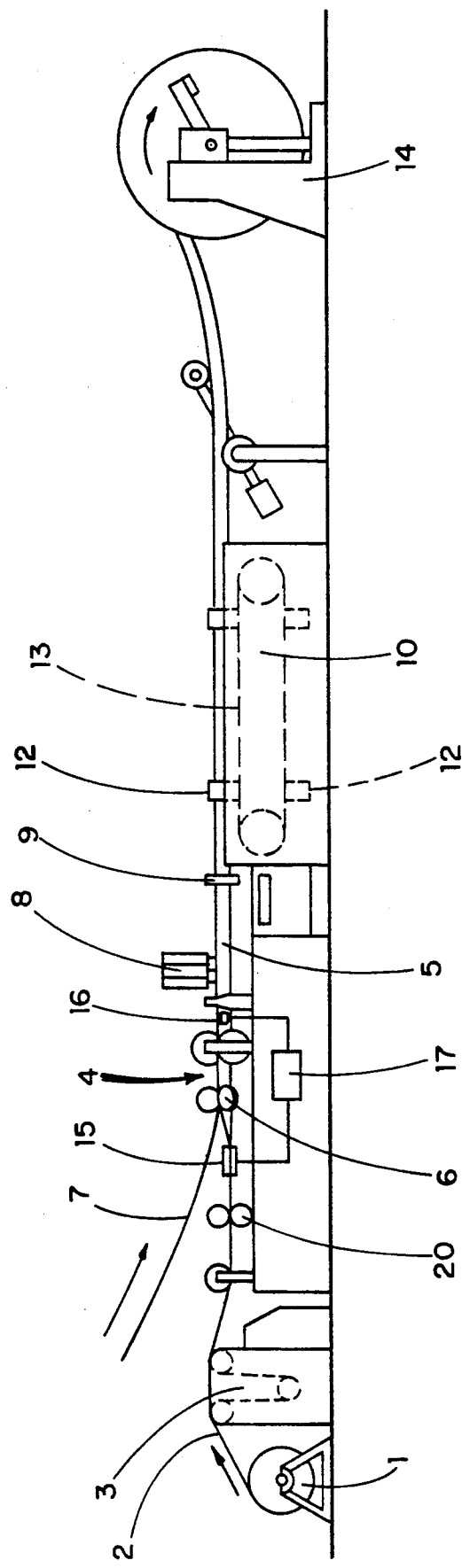

From the trimming device 20, the trimmed metallic strip 2 is passed into an input side of a plurality of forming rollers 4. The spacial position and configuration of the individual rollers and the thickness and width of the metallic strip 2 are such as to form the metallic strip 2 into a closed tubular sheath 5. A first forming stage of the forming rollers 4 is comprised of a pair of forming wheels 6, while the subsequent forming stages of the forming rollers 4 comprise cone shaped tubes and rings of a type priorly known.

Concurrently, a conductor element 7 comprised of a plurality of optical fibers is longitudinally drawn from a supply drum (not shown) toward and into the front end of the forming wheels 6. Thus, the conductor element 7 is axially positioned within the tubular sheath 5 as the metallic strip 2 is formed into such sheath by its passage through the plurality of forming rollers 4.

At the output side of the forming rollers 4 there is positioned a welding device 8 for welding the longitudinally abutting edges of the tubular sheath 5 as such sheath is continuously drawn through such welding device. In the exemplary embodiment, the welding device 8 is a polyarc welding apparatus employing well known welding techniques conducted in an inert gas environment. If the apparatus of the present invention is to be employed in the manufacture of extended lengths of conductor elements for submarine cables, then it would be advantageous if the welding device employed is of the laser type. A laser type welding device would, of course, be advantageous if the tubular sheath is of a minimal diameter and/or if high welding speeds are required.

After the welding device 8 there are, successively: a draw down die 9 for reducing the outer diameter of the welded tubular sheath 5, thus enabling the use of a metallic strip 2 of greater width for a desired small diameter sheath; a capstan draw apparatus 10 and a take-up drum 14.

The capstan draw apparatus is of a priorly known type (see, for example, U.S. Pat. Nos. 3,085,729; 3,116,865; and 3,128,930) for periodically gripping and transversely moving the welded tubular sheath 5 in a longitudinal path. There is included in the capstan draw apparatus 10 a plurality of gripper assemblies, each including a pair of clamping collets 12, mounted on oppositely positioned, endless driven chains 13. Each of the gripper assemblies periodically engages a portion of the outer circumferential surface of the welded tubular sheath 5 for retaining a tight circumferential grip on the sheath so as to prevent slipping or turning of the sheath.

The conductor element 7 is drawn into the front end of the forming wheels 6, and thus longitudinally within the tubular sheath 5 being formed. At this point of entry, the longitudinal speed of the conductor element 7 and that of the tubular sheath 5 are maintained at equal, uniform rates such that there is on relative longitudinal speed therebetween. Provided in the vicinity of the input side of the forming wheels 6, is an inductive heating device 15 that encompasses a portion of the metallic strip 2. The inductive heating device 15 is electrically connected by way of a control circuit 17 to a temperature measuring device 16 positioned in the vicinity of the output side of the forming rollers 4 to make sliding contract with the longitudinally moving tubular sheath 5. The temperature measuring device 16 in conjunction with the control circuit 17 controls the inductive heating o the metallic strip 2 entering the forming wheels 6 in a manner to cause a temporary, uniform longitudinal expansion of that portion of the metallic strip that is about to be formed into the tubular configuration of the sheath 5.

Since the longitudinal velocities of the metallic strip 2 and the conductor element 7 are equal at their entry into the forming wheels, but the metallic strip 2 then (in its tubular configuration) contracts further downstream, the length of the conductive element 7 within the encompassing tubular sheath 5 is uniformly greater than the length of the encompassing tubular sheath. Such greater length of the conductor element 7 obviates the dangers of mechanical stress being applied to the optical fibers of the conductor element.

While the invention has been described in connection with an exemplary embodiment thereof, it will be understood that many modifications will be apparent to those of ordinary skill in the art and that this application is intended to cover any adaptation or variation thereof. Therefore, it is manifestly intended that the invention be only limited by the claims and equivalents thereof.

What is claimed is:

1. Method of forming a metallic sheath about a conductor element comprised of a plurality of optical fibers, comprising the steps of:
   continuously drawing a metallic strip in a longitudinal direction through a forming means to form a hollow tubular member;
   heating a portion of the continuously drawn, metallic strip as it enters a front end of said forming means for temporarily lengthening the metallic strip as it is formed into the hollow tubular member;
   continuously drawing a conductor element comprised of a plurality of optical fibers in a longitudinal direction into the front end of said forming means;
   continuously welding longitudinally edges of the hollow tubular member;
   continuously sensing the temperature of a surface of the hollow tubular member as it passes from said forming means; and
   continuously adjusting the heating of the continuously drawn metallic strip in response to the sensed temperature of the hollow tubular member for maintaining a temporary lengthening of the metallic strip,
   wherein the absolute length of conductor element is rendered greater than that of the encompassing, welded tubular member.

2. Apparatus for forming a metallic sheath about a conductor element comprised of a plurality of optical fibers, comprising:
   means for continuously drawing a metallic strip and a conductor element comprised of a plurality of optical fibers in longitudinal directions;
   forming means for continuously forming said metallic strip into a hollow tubular member, said forming means including a front end into which the metallic strip and the conductor element are drawn;

a heating means for heating a portion of the continuously drawn, metallic strip as it enters said front end of said forming means for temporarily lengthening the metallic strip as it is formed into the hollow tubular member;

means for continuously welding longitudinal edges of the hollow tubular member formed about the conductor element;

means for continuously sensing the temperature of the surface of the hollow tubular member being formed in said forming means; and control means connected between said sensing means and said heating means for continuously adjusting the heating of said metallic strip for maintaining a predetermined amount of temporary lengthening of the metallic strip.

3. Apparatus in accordance with claim 2, wherein said sensing means is comprised of a pair of thermoelectric elements positioned so as to make sliding contact with an outer surface of said hollow tubular member as it passes from the forming means.

* * * * *